United States Patent [19]

deKruyff

[11] 4,054,303
[45] Oct. 18, 1977

[54] VEHICLE FRONT SUSPENSION STABILIZER BAR

[75] Inventor: Bob deKruyff, Flint, Mich.

[73] Assignee: General Motors Corporation, Detroit, Mich.

[21] Appl. No.: 698,907

[22] Filed: June 23, 1976

[51] Int. Cl.² ............................................. B60G 11/20
[52] U.S. Cl. .................................... 280/689; 280/696; 267/11 R
[58] Field of Search ...................... 280/689, 696, 726; 267/11

[56] References Cited

U.S. PATENT DOCUMENTS 2,471,135 5/1949 Wyeth ............................. 280/689 X
2,554,784 5/1951 Leighton ........................... 267/11 R Primary Examiner—Philip Goodman
Attorney, Agent, or Firm—John P. Moran

[57] ABSTRACT

A stabilizer bar arrangement including cross-bars secured at their outer ends to the oppositely disposed lower control arms and having juxtapositioned inner ends, with a slot formed in one bar and a pin mounted on the other bar for extension through the slot, the pin serving (1) to slide freely in the slot when the vehicle sustains equal and opposite wheel and lower control arm displacements, and (2) to prevent opposite vertical movements of the inner ends of the bars during turning operations, thereby limiting roll or tilt of the vehicle.

3 Claims, 4 Drawing Figures

VEHICLE FRONT SUSPENSION STABILIZER BAR

This invention relates generally to automotive vehicle stabilizing means and, more particularly, to sway or roll controlling devices for use with independent front suspension systems.

While conventional stabilizer arrangements in use today are generally satisfactory, it may be desirable for some vehicular models to utilize a stabilizing means between oppositely disposed lower suspension control arms which provides for vehicular roll or sway control during turning operations, while permitting independent control arm movement during straight-ahead vehicular travel wherein any impacts to which the front wheels are subjected are constant. As a result, the ride and handling characteristics of the vehicle are generally smooth, while the degree of vehicular roll or sway is effectively controlled during turning or cornering operations.

Accordingly, an object of the invention is to provide an improved vehicular stabilizer arrangement for use in conjunction with an independent front suspension system.

Another object of the invention is to provide an improved stabilizer arrangement whereby vehicle roll or sway is controlled during turns, but whereby operational spread or closure of the front wheels and, hence, symmetrical lateral and vertical movements of the lower control arms, is unimpeded.

A further object of the invention is to provide a stabilizer arrangement for use with an independent front wheel suspension system, including laterally extending cross-bars secured at their outer ends to respective lower suspension control arms and having their innermost ends juxtapositioned, with an elongated slot formed in one end and a pin formed on the other end for extension through the elongated slot, allowing free movement therein during equal and opposite right and left wheel and control arm displacements, while controlling opposite vertical movement of the cross-bars during vehicular turning and cornering operations.

These and other objects and advantages of the invention will be apparent when reference is made to the following description and accompanying drawings, wherein.

Figure 1:
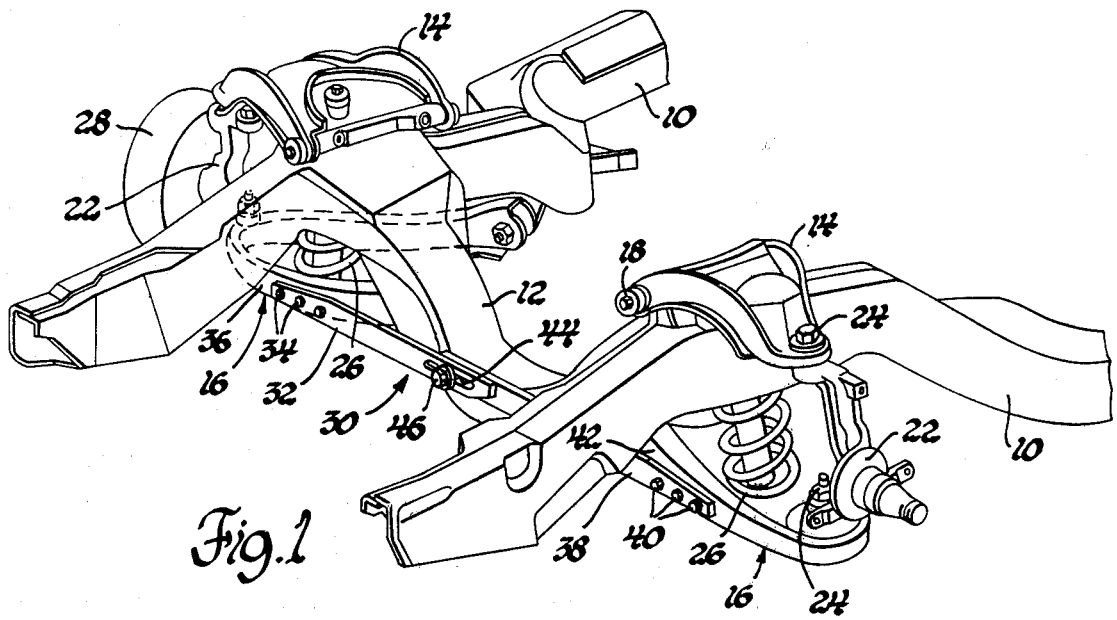
FIG. 1 is a fragmentary perspective view of a vehicular chassis embodying the invention.

Referring now to the drawings in greater detail, FIG. 1 illustrates a vehicular frame including side rails 10 and a front cross member 12, and an independent front suspension system including oppositely disposed upper and lower control arms 14 and 16, respectively. Each upper control arm 14 is pivotally connected by suitable fastener means 17 at its inner end to a mounting bracket 18 formed on an upper surface of the adjacent side rail 10, and each lower control arm 16 is pivotally connected by suitable fastener means 19 to a mounting bracket 20 on a lower portion of the adjacent side rail 10. A wheel spindle assembly 22 is pivotally connected by suitable bolts 24 to the outer ends of each set of upper and lower control arms. A coil spring 26 is mounted between each lower control arm 16 and the side rail 10. A steerable wheel 28 is rotatably supported on each of the wheel spindle assemblies 22. And stabilizer means 30 is operatively connected between the oppositely disposed lower control arms 16.

The stabilizer means 30 includes a first cross-bar 32 rigidly secured at one end thereof by a convenient means, such as bolts 34, to a suitable surface, such as the front vertical wall 36 of one of the lower control arms 16, and extending toward the other of the lower control arms 16. A second cross-bar 38 is rigidly secured at one end thereof by bolts 40 to the front vertical wall 42 of the other lower control arm 16, and extending therefrom so as to assume a juxtaposition with respect to the first cross-bar 32. An elongated slot 44 is formed adjacent the end of one of the cross-bars, say, cross-bar 32. A bolt or pin 46 is secured adjacent the end of the other cross-bar 38 and extended through the slot 44. secured adjacent the end of the other cross-bar 38 and extended through the slot 44.

Figure 3:
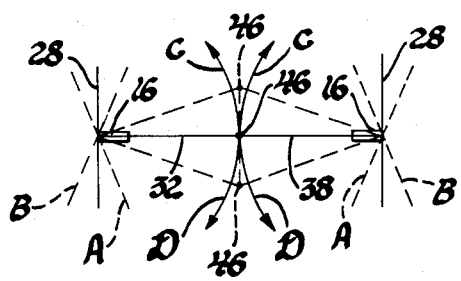
FIGS. 3 and 4 are diagrammatic views illustrating operational characteristics of the invention.

In operation, when the vehicle sustains ride motions which result in equal and opposite right and left wheel 28 and control arm 16 displacements, represented by A and B conditions in FIG. 3, the pin 46 is free to move along the slot 44 to thereby permit relative lateral movements of the slot 44 and pin 46, accommodating consistent upward or downward movements of the cross-bars 32 and 38 and the lower control arms 16, during which the juxtapositioned ends of the cross-bars are caused to move along respective symmetrical arcuate paths C and D, as shown in FIG. 3.

Figure 4:
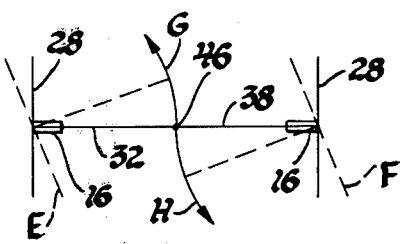
Figure 2:
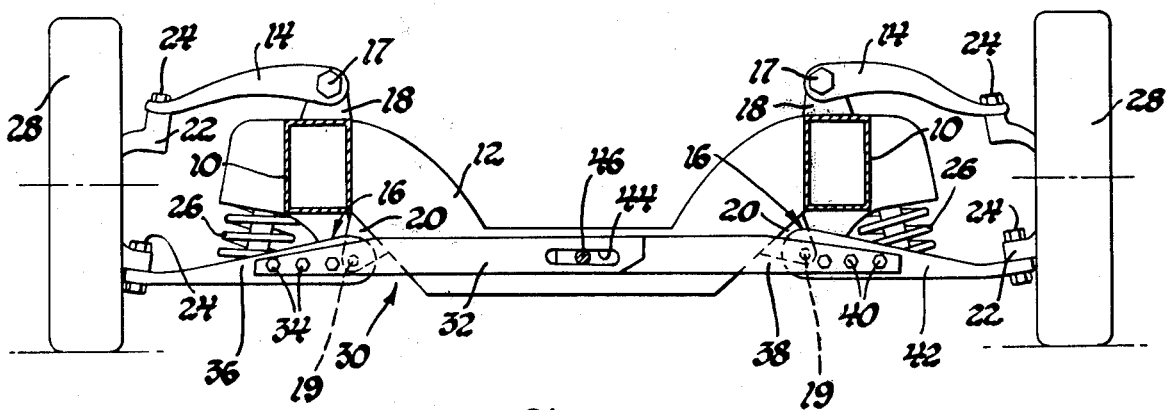
FIG. 2 is a plan view in partial cross section of a vehicular chassis embodying the invention.

Now, as the vehicle sustains ride motions which result in unequal right and left wheel 28 and lower control arm 16 displacements, such as would be encountered in a turning operation and represented by E and F conditions in FIG. 4, the inner juxtapositioned ends of the cross-bars 32 and 38 would be urged toward opposite vertical directions, one tending toward an upward arcuate path G and the other tending toward a downward arcuate path H. When this occurs, the upper and lower edges of the slot 44 serve to restrict vertical movement of the pin 46 and, in turn, restricting vertical movement of the ends of the cross-bars 32 and 38. Accordingly, a resistance to tilting of the vehicle is effected during turning or cornering operations.

It should be apparent that the degree of tilting of the vehicle and, hence, the type of ride experienced by the passengers, may be controlled with cross-bars 32 and 38 that are formed in any predetermined cross-sectional shape, resulting in a predetermined degree of bending, as required for a preferred vehicular roll characteristic.

It should also be apparent that the stabilizer bars may not only be secured in any suitable manner to any convenient surface of the lower control arms 16, but, if desired, may be secured to suitable surfaces of the upper control arms instead of being secured to the lower arms.

While but one embodiment of the invention has been shown and described, other modifications thereof are possible.

What is claimed is:

1. For use in conjunction with an independent front suspension for vehicles having a frame, an upper control arm pivotally connected at its inner end to an upper portion of each of opposite side walls of said frame, a lower control arm pivotally connected at its inner end to a lower portion of each of opposite side walls of said frame, a wheel spindle assembly pivotally connected at its upper and lower ends to the outer ends of each set of upper and lower control arms, and a steerable wheel rotatably supported on each of said wheel spindle assemblies, stabilizer means operatively connected between said oppositely disposed lower control arms, said stabilizer means comprising a first cross-bar rigidly secured at the outer end thereof to a surface of one of said lower control arms and extending transversely therefrom toward the other of said lower control arms, a second cross-bar rigidly secured at the outer end thereof to a surface of said other of said lower control arms and extending transversely therefrom toward said one of said lower control arms, the respective inner ends of said first and second cross-bars being juxtaposed one in front of the other, a lateral slot formed in one of said inner ends, and a pin secured to the other of said inner ends and extending horizontally through said lateral slot, said pin and slot accommodating equal and oposite lateral movements of said cross-bars and lower control arms, and said pin and slot resisting opposing vertical movements of said cross-bars and lower control arms when said vehicle is subjected to control arm displacements encountered in a turning operation, thereby limiting tilting of said vehicle during said turning operation.

2. For use in conjunction with an independent front suspension system for vehicles having a frame, an upper control arm pivotally connected at its inner end to an upper portion of each of opposite side walls of said frame, a lower control arm pivotally connected at its inner end to a lower portion of each of opposite side walls of said frame, a wheel spindle assembly pivotally connected at its upper and lower ends to the outer ends of each set of upper and lower control arms, and a steerable wheel rotatably supported on each of said wheel spindle assemblies, stabilizer means operatively connected between said oppositely disposed lower control arms, said stabilizer means comprising a first cross-bar rigidly secured at the outer end thereof to a surface of one of said lower control arms and extending transversely therefrom toward the other of said lower control arms, a second cross-bar rigidly secured at the outer end thereof to a surface of said other of said lower control arms and extending transversely therefrom toward said one of said lower control arms, said first and second cross-bars, having a predetermined inherent resiliency, the respective inner ends of said first and second cross-bars being juxtaposed one in front of the other, a lateral slot formed in one of said juxtaposed inner ends, and a pin secured to the other of said juxtaposed inner ends and extending horizontally through said lateral slot, said slot accommodating lateral movement of said pin therein in response to lateral movements of said cross-bars and lower control arms when said vehicle sustains ride motions which result in equal and opposite right and left control arm displacements, and said slot resisting vertical movement of said pin and, hence, vertical movements of said cross-bars and lower control arms when said vehicle is subjected to unequal right and left control arm displacements encountered in a turning operation, said inherent resiliency of said cross-bars thereby limiting the degree of tilt of said vehicle during said turning operation.

3. For use in conjunction with an independent front suspension system for vehicles having a frame, an upper control arm pivotally connected at its inner end to an upper portion of each of opposite side walls of said frame, a lower control arm pivotally connected at its inner end to a lower portion of each of opposite side walls of said frame, a wheel spindle assembly pivotally connected at its upper and lower ends to the outer ends of each set of upper and lower control arms, and a steerable wheel rotatably supported on each of said wheel spindle assemblies, stabilizer means operatively connected between one of said oppositely disposed upper and lower pairs of control arms, said stabilizer means comprising a first cross-bar rigidly secured to one of said control arms on one side of the vehicle and extending inwardly therefrom toward the other of said control arms on the other side of the vehicle, a second cross-bar rigidly secured to said other of said control arms on said other side of the vehicle and extending inwardly therefrom toward said one of said control arms, the respective inner ends of said first and second cross-bars being juxtaposed as seen in the vertical view, said one of said control arms having a slot extending horizontally therethrough and elongated along the length thereof in the juxtaposed portion, and a pin secured to the other of said control arms in said juxtaposed portion and extending horizontally into said lateral slot and movable in either direction from the position when said vehicle is at rest, said pin and slot accommodating lateral movement of said cross-bars in their lengthwise directions when said vehicle sustains ride motions which result in equal and opposite right and left wheel and control arm displacements, and said pin and slot resisting unlike vertical movements of said cross-bars so as to resist like swinging movements of said control arms when said vehicle is subjected to unequal right and left wheel and control arm displacements encountered in a turning operation, thereby opposing tilting of said vehicle during said turning operation.

* * * * *

UNITED STATES PATENT AND TRADEMARK OFFICE
CERTIFICATE OF CORRECTION

PATENT NO. : 4,054,303
DATED : October 18, 1977
INVENTOR(S) : Bob deKruyff

It is certified that error appears in the above-identified patent and that said Letters Patent are hereby corrected as shown below:

Column 2, line 17-19, delete "secured adjacent the end of the other crossbar 38 and extended through the slot 44".

Column 4, line 23, "and" should read -- or --.

Signed and Sealed this

Second Day of May 1978

[SEAL]

Attest:

RUTH C. MASON
Attesting Officer

LUTRELLE F. PARKER
Acting Commissioner of Patents and Trademarks